M. W. SMITH.
COMBINATION RAKE, SCOOP, AND SCRAPER.
APPLICATION FILED APR. 5, 1912.
1,050,305.  Patented Jan. 14, 1913.
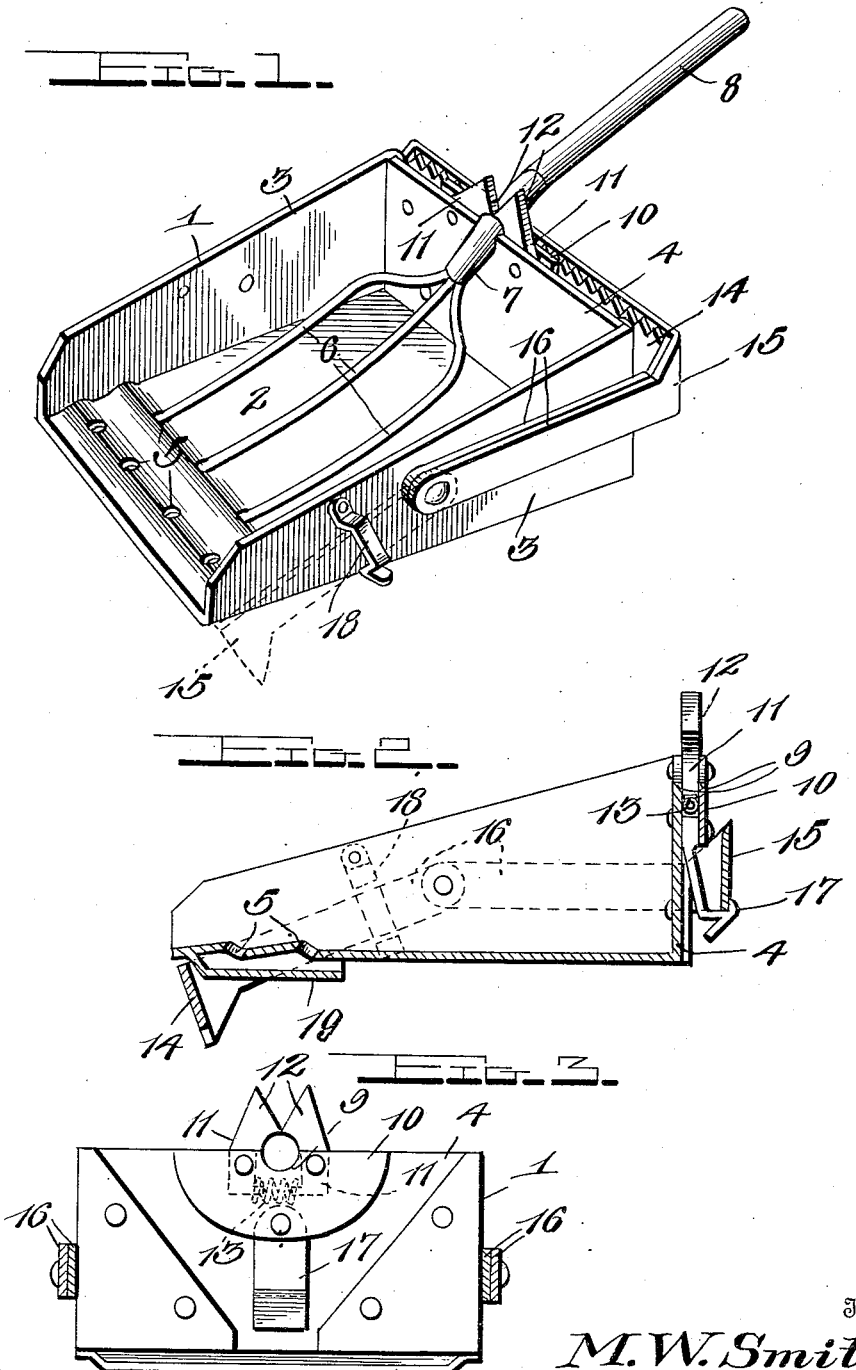
Witnesses
Chas. L. Griesbauer.
A. B. Norton.
Inventor
M. W. Smith,
By Watson E. Coleman.
Attorney

UNITED STATES PATENT OFFICE.

MARTIN W. SMITH, OF ENID, OKLAHOMA.

COMBINATION RAKE, SCOOP, AND SCRAPER.

1,050,305.  Specification of Letters Patent.  Patented Jan. 14, 1913.

Application filed April 5, 1912. Serial No. 688,795.

*To all whom it may concern:*

Be it known that I, MARTIN W. SMITH, a citizen of the United States, residing at Enid, in the county of Garfield and State of Oklahoma, have invented certain new and useful Improvements in Combination Rakes, Scoops, and Scrapers, of which the following is a specification, reference being had to the accompanying drawings.

This invention comprehends certain new and useful improvements in farm or garden tools and relates particularly to a combination scoop, rake and scraper or hoe, designed especially for use on a farm or about poultry yards or threshing machines, for instance, in gathering all fine trash or grain in heaps and then scooping up the same.

The invention has for its primary object a simple and efficient implement of this character which may be attached to any fork and serve as either a scoop, a rake, or a scraper or hoe, and which may be easily converted from one device to another, without the separation or attachment of any parts, but by simple adjustments which may be easily effected.

The invention also has for its object a simple, durable and efficient construction of a tool of this character, the parts of which may be cheaply manufactured and readily assembled and not liable to get out of order.

The invention also aims to generally improve devices of this class to render them more useful and commercially valuable.

With these and other objects in view as will more fully appear as the invention proceeds, the invention consists in certain constructions and arrangements of parts that I shall hereinafter fully describe and claim.

For a full understanding of the invention, reference is to be had to the following description and accompanying drawing, in which, Figure 1 is a perspective view of my device. Fig. 2 is a longitudinal sectional view thereof; and Fig. 3 is a rear view with parts in section.

Corresponding and like parts are referred to in the following description and designated in all the views of the accompanying drawing by like reference characters.

My improved agricultural implement includes a body portion 1, which is formed with a substantially flat bottom 2, side flanges 3 and a rear flange 4 that are secured together by rivets or the like in an overlapped registration, best illustrated in Fig. 3. The bottom 2 of the body portion 1 is formed with a number of apertures 5, arranged in any desired number of sets, and there being any desired number of apertures in each set, so that the body portion 1 and its correlated parts may be connected to any ordinary fork, irrespective of the exact number of tines. In the present embodiment of the invention, there are two sets or series of these apertures 5, arranged one back of the other, one set embodying four apertures and the other set embodying three, but, as above indicated, the invention is not limited in this regard. The apertures 5 are designed to receive the pointed extremities of the tines 6 of a fork 7, the handle 8 of which is intended to rest within an upwardly facing socket 9 formed in the upper edge of the rear flange 4 and in a reinforcing plate 10 secured thereto. In order to securely and yet detachably hold the fork 7 in place, I provide oppositely acting jaws 11 which are pivoted between the plate 10 and the adjoining wall of the rear flange 4 and which are provided with upwardly projecting hooked extremities adapted to extend over the handle 8 and with the lugs 12 on their lower ends designed for engagement with an expansion spring 13, whereby the jaws are normally held in closed position. In order to slip the handle into place, it is only necessary to open the jaws against the tension of the spring 13 and to then release the jaws so as to permit the spring to act so that the hooked upper ends of jaws will extend over the handle. By this means, as is evident, the body portion 1 may be securely attached to the fork whereby the handle of the latter will serve as the handle for all the tools embodied in the device.

In connection with the body portion 1, I use a rake 14 and a hoe or scraper 15. Both of these parts are provided at their ends with angularly disposed attaching arms 16 that are preferably connected by common pivots to the outer sides of the side flanges 3. Preferably the parts 14 and 15 are so proportioned that they will nest one within the other, when desired, so that either or both of them may be held out-of-the-way in an inoperative position at the rear of the body portion 1, by a suspension latch 17, which is preferably pivotally connected at its upper end in between the reinforcing plate 10 and the rear flange 4, said latch being formed with a hooked extremity which will, when required, engage the rake or the hoe, or both of them, and hold either or both in the desired inoperative position. When either of these parts, namely, the rake or the hoe, are required for use, it can be swung downwardly and forwardly so as to rest underneath the forward edge of the bottom 2, being held in such position by latches 18 which are secured to the side flanges 3, as clearly illustrated in the drawing and which are designed to spring into locking engagement with the attaching arms 16.

Preferably, in order to prevent the tines from gathering up straw or rubbish and the like, the bottom of the body portion 1 is provided with a preferably integral strip 19 which extends underneath the perforations or apertures 5. As will be understood, the body portion 1 constitutes the scoop of the device as well as a direct supporting member for the rake and hoe.

From the foregoing description in connection with the accompanying drawing, the operation of my improved agricultural implement or tool will be apparent. As before described, it is only necessary, when desiring to use the device, to slip the tines of a fork into the proper apertures 5 of the scoop or body portion 1 and to slip the handle 8 of the fork in between the spring pressed jaws 11. If the device is then to be used as a rake or hoe, or scraper in raking or scraping up straw or rubbish into heaps, preparatory to scooping the same up, the rake 14 or the hoe 15 is swung forwardly so that its attaching arms 16 will be engaged by the latches 18. After the rubbish or the like is heaped up, the rake or hoe, as the case may be, is swung rearwardly again to its inoperative position and the body portion 1 used as a scoop, in an evident manner. In the inoperative position of the rake and hoe, they are, as before specified, held at the heel or rear lower corner of the scoop by means of the hooked lower end of the latch 17. It will thus be seen that I have provided a very simple, durable and efficient construction of tool, which may be used in performing a plurality of different operations and which therefore, not only effects economies, but enables the operator to always have at hand in one and the same device, a plurality of implements or tools for scraping, raking, or scooping.

While the accompanying drawing illustrates what I believe to be the preferred embodiment of my invention, it is to be understood that the invention is not limited thereto, but that various changes may be made in the construction, arrangement and proportions of the parts without departing from the scope of the invention as defined in the appended claims.

Having thus described my invention, what I claim is:—

1. A device of the character described, including a body portion in the form of a scoop, a scraping implement pivotally connected thereto and adapted to rest underneath the front edge thereof, means for detachably holding said implement in such position, and means for holding said implement in an inoperative position at the rear side of said body portion.

2. A device of the character described, including a body portion, a rake formed with angularly disposed arms by which it is pivotally connected to the body portion to swing underneath the bottom thereof, and means for holding said rake in an operative position underneath the forward edge of the body portion.

3. A device of the character described, including a body portion, a rake and a hoe both provided with angularly disposed arms pivoted at a common point to the sides of the body portion, and means for holding one of these implements, namely, the rake and the hoe, in an inoperative position at the rear of the body portion and the other in an operative position underneath the front edge of said body portion.

4. A device of the character described, including a body portion embodying a bottom and side and rear flanges, a scraping implement provided with angularly disposed arms pivotally connected to the side flanges and adapted to swing underneath the bottom, latches connected to said side flanges and arranged to engage said angular arms to hold the implement extended forwardly underneath the front edge of the bottom, and a latch carried by the rear flange and adapted to engage said implement to hold the latter in an inoperative position at the rear of the bottom.

5. A device of the character described, including a body portion, a scraping implement pivotally connected to said body portion to swing forwardly and rearwardly underneath the bottom thereof, and means for detachably connecting said body portion with a fork.

In testimony whereof I hereunto affix my signature in the presence of two witnesses.

MARTIN W. SMITH.

Witnesses:
HEBER BLASDEL,
ERNEST G. SMITH.

---

Copies of this patent may be obtained for five cents each, by addressing the "Commissioner of Patents, Washington, D. C."